(12) United States Patent
Müller et al.

(10) Patent No.: US 12,325,069 B2
(45) Date of Patent: Jun. 10, 2025

(54) ADDITIVELY MANUFACTURED COMPONENT HAVING A SUPPORT STRUCTURE AND METHOD FOR MANUFACTURING A COMPONENT OF THIS TYPE

(71) Applicant: Siemens Energy Global GmbH & Co. KG, Bayern (DE)

(72) Inventors: Vinzenz Müller, Berlin (DE); Ole Geisen, Berlin (DE); Michael Hajduk, Berlin (DE); Timo Heitmann, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 18/029,480

(22) PCT Filed: Aug. 31, 2021

(86) PCT No.: PCT/EP2021/073954
§ 371 (c)(1),
(2) Date: Mar. 30, 2023

(87) PCT Pub. No.: WO2022/096174
PCT Pub. Date: May 12, 2022

(65) Prior Publication Data
US 2024/0238872 A1    Jul. 18, 2024

(30) Foreign Application Priority Data

Nov. 4, 2020  (EP) ..................... 20205689

(51) Int. Cl.
*B22F 10/28*   (2021.01)
*B22F 10/36*   (2021.01)
(Continued)

(52) U.S. Cl.
CPC .............. *B22F 10/28* (2021.01); *B22F 10/36* (2021.01); *B22F 10/47* (2021.01); *B33Y 10/00* (2014.12); *B33Y 80/00* (2014.12); *B22F 2998/10* (2013.01)

(58) Field of Classification Search
CPC .......... B22F 10/28; B22F 10/36; B22F 10/47; B22F 2998/10; B22F 2999/00;
(Continued)

(56) References Cited

U.S. PATENT DOCUMENTS

| | | | |
|---|---|---|---|
| 2019/0270254 A1* | 9/2019 | Mark | .................... B29C 64/118 |
| 2020/0063242 A1 | 2/2020 | Angles | |
| 2020/0108441 A1 | 4/2020 | Jones | |

FOREIGN PATENT DOCUMENTS

| | | |
|---|---|---|
| CN | 105818385 A | 8/2016 |
| EP | 3381593 A2 | 10/2018 |
| EP | 3632591 A1 | 4/2020 |

OTHER PUBLICATIONS

Oter, Zafer Cagatay, et al. "Support optimization for overhanging parts in direct metal laser sintering." Optik 181 (2019): 575-581; XP055718960; DE; ISSN: 0030-4026; DOI: 10.1016/j.ijleo.2018. 12.072 (Year: 2019).*

(Continued)

*Primary Examiner* — Rebecca Janssen
(74) *Attorney, Agent, or Firm* — Wolter Van Dyke Davis, PLLC

(57) ABSTRACT

A component which was manufactured in a powder-bed production process, proceeding from a base plane. The component includes a finished part and a support structure. The finished part can be divided into an easy portion, which can be manufactured from the base plane without a support structure, and a difficult portion, which cannot be manufactured without a support structure. The support structure is connected to the easy portion by a first partial attachment (Continued)

and to the difficult portion by a second partial attachment. In order to simplify the subsequent processing, the first partial attachment has a plurality of connection points having an equivalent diameter of at most 1 mm.

13 Claims, 7 Drawing Sheets

(51) Int. Cl.
*B22F 10/47* (2021.01)
*B33Y 10/00* (2015.01)
*B33Y 80/00* (2015.01)

(58) Field of Classification Search
CPC ........ B22F 10/366; B22F 10/40; B22F 10/43; B33Y 10/00; B33Y 80/00; B28B 1/001; Y02P 10/25
See application file for complete search history.

(56) References Cited

OTHER PUBLICATIONS

PCT International Search Report and Written Opinion of International Searching Authority mailed Nov. 9, 2021 corresponding to PCT International Application No. PCT/EP2021/073954 filed Aug. 31, 2021.

Oter, Zafer Cagatay, et al. "Support optimization for overhanging parts in direct metal laser sintering." Optik 181 (2019): 575-581; XP055718960; DE; ISSN: 0030-4026; DOI: 10.1016/j.ijleo.2018.12.072.

\* cited by examiner

ADDITIVELY MANUFACTURED COMPONENT HAVING A SUPPORT STRUCTURE AND METHOD FOR MANUFACTURING A COMPONENT OF THIS TYPE

CROSS REFERENCE TO RELATED APPLICATIONS

This application is the US National Stage of International Application No. PCT/EP2021/073954 filed 31 Aug. 2021, and claims the benefit thereof. The International Application claims the benefit of European Application No. EP20205689 filed 4 Nov. 2020. All of the applications are incorporated by reference herein in their entirety.

FIELD OF INVENTION

The invention relates to an additively manufactured component for the further manufacture of a finished part, wherein the finished part requires a support structure on account of the design since direct production of the entire finished part by means of known production processes is not possible without the support structure. The invention furthermore relates to the corresponding method for manufacturing the component.

BACKGROUND OF INVENTION

Various methods for additively manufacturing a component are known from the prior art. A relevant process in this context is manufacture by the "powder-bed" production process, in which the component is built up in layers. For the manufacture of a metal component, use is generally made of the "SLM method" (selective laser melting method), in which a powdered material is melted in layers at the location of the respective component. In this process, the manufacture of the component starts from a base surface, on which the corresponding powder is applied in layers.

Now, it is known from the prior art that it is not possible to produce arbitrary geometries without appropriate auxiliary measures. Problems that may arise can be, on the one hand, the inadequate dissipation of the heat introduced by the melting process or, on the other hand, local sinking of the structure just produced in the powder bed, resulting in inaccurate reproduction of the finished part. Therefore, frequent use is made of support structures, which have to be removed again after the manufacture of the component in order to obtain the finished part. In order, on the one hand, to keep down the outlay for producing the support structures and also for removing the support structure, there is an attempt to reduce the respective support structure to what is necessary. In this context, as a general rule, the support structures are built up starting from the base surface.

When using support structures which extend from the base surface as far as the problematic partial section of the finished part, it is particularly disadvantageous if the distance from the base surface to the finished part is very large. Furthermore, finished parts sometimes have geometries with which it is not possible to use support structures starting from the base surface in order to support problematic partial sections.

In these cases, the support structures used are attached at one end to a partial section of the finished part which can initially be produced without problems, in order to enable the problematic partial section to be supported from there. As a general rule, it proves to be disadvantageous that it is precisely in these cases that accessibility to the support structures is made more difficult and thus the removal of the support structure is associated with particular difficulties.

In any case, it is advantageous not to form the connection of the support structure to the finished part over the entire area. In this regard, EP 3632591 A1 and the publication ZAFER CAGATAY OTER ET AL: "Support optimization for overhanging parts in direct metal laser sintering" (published in "Optik—International Journal for Light and Electron Optics", 2019) are known. It is proposed here to produce a connection which consists of a multiplicity of teeth or a multiplicity of points.

SUMMARY OF INVENTION

In this regard, it is the object of the present invention to provide a connection between a support structure and a finished component, the distance of which from the component can be achieved simply and reliably.

The object addressed is achieved by means of an embodiment of a component according to the invention according to the teaching of the independent claim. A method according to the invention for manufacturing such a component is specified herein. Advantageous embodiments are the subject matter of the dependent claims.

The component of the type in question is first of all manufactured in a powder-bed production process. Which of the manufacturing methods known for this purpose has been used is irrelevant in the first instance. At the least, the powder-bed production process defines a base plane extending in an X direction and a Y direction. In this case, the component is built up from the base plane, where the base plane thus also defines a Z direction of the component. In this regard, it should be noted that, for the definition of the component in question, the base plane allows only the determination of coordinates or an orientation.

What kind of component is involved here is also irrelevant in the first instance. At the least, the solution according to the invention is suitable, in particular, for a component which consists of a metallic material. Likewise, the embodiment can advantageously be used with a component made of a ceramic material.

The component considered here comprises a finished part. In this case, the finished part can be an end product, but as a general rule the finished part is also subjected to further manufacturing processes. With respect to the powder-bed production process used, the finished part can be subdivided into various sections as regards manufacturability. Thus, there is at least one easy partial section, which is characterized in that, starting from the base plane, this region of the finished part can be produced directly by the powder-bed production process without a support structure. Furthermore, the finished part comprises a difficult partial section, which is characterized in that its manufacture by the powder-bed production process is not readily possible, and therefore the use of a support structure is necessary in order to achieve the desired result.

Accordingly, the component under consideration furthermore comprises at least one support structure, which makes it possible to produce the difficult partial section. Here, the support structure is connected to the difficult partial section via a second partial attachment. In contradistinction to embodiments in which the support structure likewise extends from the base plane, provision is made in this case for the support structure to be connected to the easy partial section by a first partial attachment. Thus, it is possible to support a difficult partial section even in the case of a relatively large distance from the base plane or in the case of insufficient accessibility between the base plane and the difficult partial section.

In this case, it is envisaged, as per the conventional case, that the first partial attachment is achieved by means of a multiplicity of mutually separate connection points and, as a result, extends over a larger surface area. It is essential here that each individual one of the connection points is selected to be as small as possible. Provision is accordingly made for an equivalent diameter of the respective connection point to be at most 1 mm. The equivalent diameter is obtained by determining the smallest cross section of the respective connection point as the connection between the support structure and the easy partial section of the finished part.

By using a multiplicity of small connection points instead of, for example, a single connection, selected to be as small as possible, between the support structure and the easy partial section, the mechanical removal of the support structure from the easy partial section, i.e. separation in the first partial attachment, is, in particular, significantly facilitated. This is, in particular, particularly advantageous since the solution envisaged is intended precisely for those applications in which accessibility is more difficult. Having said that, the solution can also be used when there is good accessibility.

Proceeding from the solution according to the invention with the multiplicity of connection points, it may however be necessary to provide an improved connection in a locally limited area in the first partial attachment, e.g. for better heat dissipation, in order to ensure the build-up of the support structure and the finished part. Therefore, the invention is considered to include an embodiment in which one or more bridge elements are used in the first partial attachment. In order to ensure the effect according to the invention, however, it is necessary that the bridge element or each of the bridge elements has a maximum width of 2 mm, wherein the extent in the second direction is initially insignificant.

If one or more bridge elements are present, it must nevertheless be ensured that the connection between the support structure and the easy partial section in the first partial attachment is implemented substantially by the connection points. This is considered to be the case if the number of connection points relative to the size of the bridge element/s is selected in such a way that the cross-sectional area of the connection points in total corresponds to at least 5 times the cross-sectional area of the bridge element/s in total.

The powder-bed production process used leads to a specific extent of the melting point starting from a beam center of the energy-intensive beam used—usually a laser beam. Thus, for example, a beam guided along a vector leads to melting of the powdered material with a process-dependent width and depth of the dissolved material. Accordingly, a specific melting point extent can be determined as the averaged value of width and depth on the component.

If the embodiment according to the invention is now considered with connection points which are as small as possible, it is necessary, in particular to achieve the desired effect, for the equivalent diameter of the connection points to be less than the specific melting point extent. It is obvious from this that, during the production of the connection points, there must not be melting of the material all the way through from the support structure to the finished part.

Even though the melting point extent represents a process parameter, it can nevertheless be determined on the finished component. In this case, the melting point extent at the same point on the component is to be used as a comparison to the equivalent diameter.

If at least one bridge element is present, it is particularly advantageous if the cross-sectional area of the connection points corresponds to at least 20 times the cross-sectional area of the bridge element/s, so that the desired effect of the small connection points is not unnecessarily reduced by the at least one bridge element.

Improved detachment of the support structure from the finished part is achieved if the connection points selected are as small as possible and the bridge element selected is as narrow as possible. Accordingly, it is advantageous if the width of the bridge element or elements is at most 1 mm. It is furthermore advantageous if the equivalent diameter of the connection points is at most 0.5 mm.

Furthermore, a greater distance between the connection points is advantageous. Accordingly, it is advantageous that the distance between adjacent connection points corresponds to at least twice the equivalent diameter. However, it is particularly advantageous if the distance between adjacent connection points corresponds to at least five times the equivalent diameter.

In order to improve the stability and heat dissipation of the first partial attachment, it is advantageous if the selected distance between the finished part and the support structure in the first partial attachment is as small as possible. Accordingly, it is advantageous if the distance between the finished part and the support structure is at most 1 mm in at least the majority (i.e. in the region of at least 50% of the area) of the first partial attachment. It is furthermore particularly advantageous if the distance is at most 0.6 mm.

Fundamentally, it is advantageous if no bridge element is required. However, if sufficient stability for the support structure in support against the easy partial section and sufficient heat dissipation from the support structure via the easy partial section cannot be achieved just with the connection points, a bridge element should advantageously be provided. In this case, it is particularly advantageous if this bridge element is arranged at the edge of the first partial attachment which is adjacent to the base plane.

To manufacture the component of the type in question, a model of a finished part is first of all required. Taking into account the intended manufacturing process in the powder-bed production process, it is possible to determine which region of the finished part can be produced directly in the intended process without further support structures and which region of the finished part cannot be reproduced in the desired quality without auxiliary measures. In this case, the first region, which can be produced starting from the base plane, forms the easy partial section. In contrast, that region which cannot be produced without auxiliary measures can be defined as the difficult partial selection.

In the following step, it is necessary to determine a support structure which makes it possible to produce the difficult partial section in the envisaged powder-bed production process.

With the definition of the component comprising the finished part and the support structure, the actual manufacture of the component can now take place in the powder-bed production process by introduction of a powdered material in layers into a construction space, with the geometry of the component being reproduced layer by layer by melting the powdered material. Here, an energy-intensive beam—generally a laser beam—is used, leading to melting of the surrounding powdered material at the respective beam center.

Here, the essential point for the embodiment according to the invention is the attachment of the support structure to the easy partial sectional via a first partial attachment, with the first partial attachment being reproduced by the layer-by-layer melting process in accordance with the embodiment according to the invention or an embodiment which is advantageous for this purpose.

The correct reproduction of the finished part with the aid of the support structure, in particular taking into account the embodiment according to the invention of the first partial attachment, is promoted if, advantageously in each layer, first the geometry of the support structure and only subsequently the geometry of the finished part is produced.

It is essential for the invention that the connection points are made as small as possible but that nevertheless sufficient stability is provided to secure the position of the support structure. Taking into account that melting of the surrounding material takes place around the beam center, it is envisaged according to the invention, for the purpose of achieving small connection points, that, during the production of the connection points, the beam center is in all cases spaced apart from the finished part, i.e. from the geometry of the finished part produced thereafter.

This ensures that the connection points selected can be smaller than the width of the material melted on both sides of the laser beam. It is obvious that, for the embodiment according to the invention, in the first partial attachment the beam center must be spaced apart from the finished part next to the connection points since, next to the connection points, no direct connection between the support structure and the finished part is envisaged.

It is obvious that the distance from the beam center to the finished part must not be greater than would correspond to a radius of the material melted by the beam in order to be able to ensure the actual connection of the support structure to the finished part in the respective connection point.

It has been found that the implementation of small connection points can advantageously be achieved if the distance from the beam center to the finished part is at least 0.05 mm. In this way, it is possible to ensure that the width of the connection point is less than the width of the material melted by the beam. It is particularly advantageous if the distance from the beam center to the finished part is at least 0.1 mm.

Furthermore, it is advantageous if, in the first partial attachment, although there is no direct connection between the support structure and the finished part next to the connection points, the distance between the two sections is as small as possible. This improves heat dissipation from the support structure to the finished part and increases the stability of the connection. It is therefore advantageous if the distance from the beam center to the finished part during the production of the support structure is at most 1.5 mm in the region of the first partial attachment. This applies to at least half the extent of the first partial attachment. A distance of at most 1 mm is advantageously maintained. It is particularly advantageous, however, if the distance is less than or at most 0.7 mm. Furthermore, it is particularly advantageous if the distance is at most 1.5 mm or advantageously at most 1 mm or particularly advantageously at most 0.7 mm over as large a proportion as possible of the first partial attachment, for example over a proportion of at least 90% of the surface.

In the manufacturing method typically used in the powder-bed production process, the extent of the melting point, i.e. the width and depth of the dissolved material, starting from the beam center, is not only dependent on the intensity of the beam, for example, but also dependent on the position of the component in the respective construction space. This is due, in particular, to the different deflection of the beam depending on the position in the construction space. Accordingly, the component has a locally specific melting point extent as a mean value of local width and depth.

If the manufacturing process is now considered with respect to the production of the individual connection points, it should be noted that the equivalent diameter is smaller than the specific melting point extent, determined at the position of the respective connection point.

Furthermore, a specific melting radius can be determined as the extent of the melted powdered material, measured from the beam center, perpendicularly to the finished part.

In order to achieve a sufficiently small cross section in the production of the connection points, it is advantageous to maintain a distance from the beam center to the finished part of at least 0.1 times the melting radius. However, it is particularly advantageous if the distance corresponds to at least 0.5 times the melting radius, whereby a particularly small cross section of the respective connection point can be achieved.

At the same time, however, consideration should be given to adequate stability. To this end, it is advantageous if the distance from the beam center to the finished part corresponds to at most 0.9 times the melting radius. It is particularly advantageous if the distance during the production of the respective connection point corresponds to at most 0.8 times the melting radius.

If the advantageously small distance between the support structure and the finished part in the region of the first partial attachment is now considered, then the beam is advantageously guided in such a way that the distance corresponds to at most 10 times the melting radius over the majority of the first partial attachment. Heat can thus be transferred via the powdered material situated between the support structure and the finished part. It is more advantageous here if the distance corresponds to at most 5 times the melting radius. It is particularly advantageous if the selected distance between the support structure and the finished part is as small as possible but not such that there is a direct connection between the support structure and the finished part in the first partial attachment (that is to say obviously without considering connection points and the possible bridge elements). Accordingly, it is particularly advantageous if a distance of at most 0.3 times the melting radius is selected. Heat transfer via the small intermediate powder layer is thereby considerably improved.

The use of an energy-intensive beam running along a path leads in each case at the end of such a path to a rounded melting zone. In the first partial attachment, the connection between the support structure and the finished part is produced only by the connection points—or the connection points and the bridge element—where, according to the invention, the connection points should be as small as possible. In order to be able to determine as precisely as possible the cross section of the respective connection point resulting from the melting process, it is advantageous if the vector along which the beam is guided during the reproduction of the support structure is aligned with the vector along which the beam is guided during reproduction of the finished part. Thus, the opposite melting zones at the end of the respective vector or of the beam meet at the connection points during the reproduction of the support structure on one side and during the reproduction of the finished part on the other side. This makes it possible to advantageously determine the cross section of the respective connection point in advance with fixed vectors for the beam.

BRIEF DESCRIPTION OF THE DRAWINGS

Exemplary embodiments of a component according to the invention are shown in the following figures.

DETAILED DESCRIPTION OF INVENTION

Figure 1:
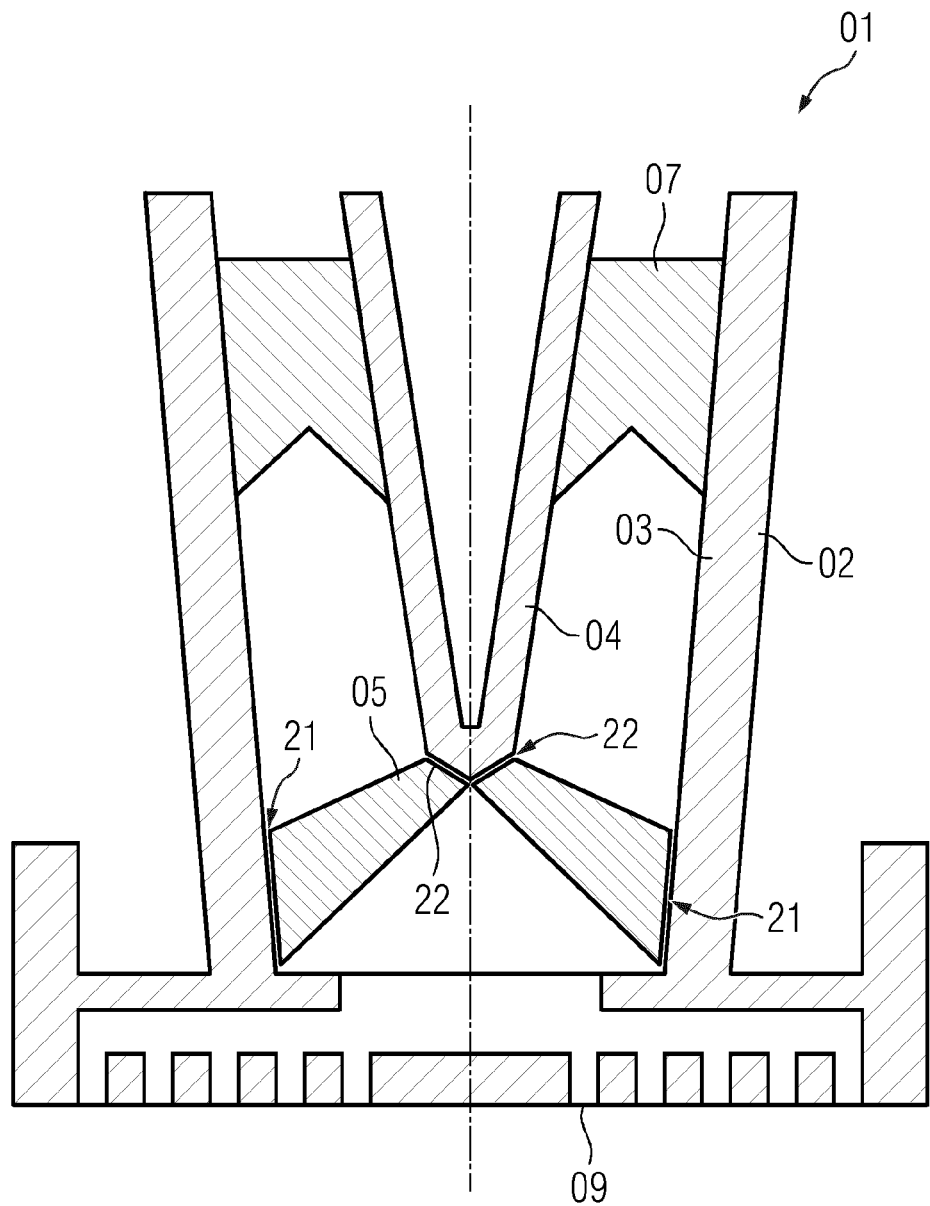
FIG. 1 shows a first schematic illustration of an example of a component according to the invention.

FIG. 1 outlines, purely schematically, a first exemplary embodiment of a component 01 according to the invention, which 01 has a finished part 02 and a support structure 05. For subsequent processes, it is basically only the finished part 02 which is required, whereas the support structure 05 is merely intended to enable the manufacturing process and is thus actually unwanted.

It is envisaged that the component 01 is manufactured in a powder-bed production process. In this case, the component 01 is built up from a base plane 09. Thus, the component 01 is delimited on one side by precisely that base plane 09. The base plane 09 extends in an X direction and a Y direction and defines a Z direction, in which the component 01 is built up in layers.

Here, the manufacturing method envisaged limits the possible configuration of the component since, depending on the geometry, the reproduction of this geometry is sometimes not readily possible. This leads to a potential division of the finished part 02 into a region, the easy partial section 03, which 03 can be produced readily in the envisaged manufacturing process. In contrast, the finished part 02 has a further region, the difficult partial section 04, which 04 it is not possible to reproduce without errors in the envisaged manufacturing process unless auxiliary measures are taken. In this exemplary embodiment, the difficult partial section 04, attached to the easy partial section 02 via ribs 07, projects freely in the direction of the base plane 09, without it being possible for the difficult partial section 04 to be built up from the base plane 09.

In order now to enable the manufacture of the finished part 02 with the difficult partial section 04, a support structure 05 is necessary. Here, the support structure 05 is connected to the easy partial section 03 via a first partial attachment 21 and to the difficult partial section 04 via a second partial attachment 22.

Figure 2:
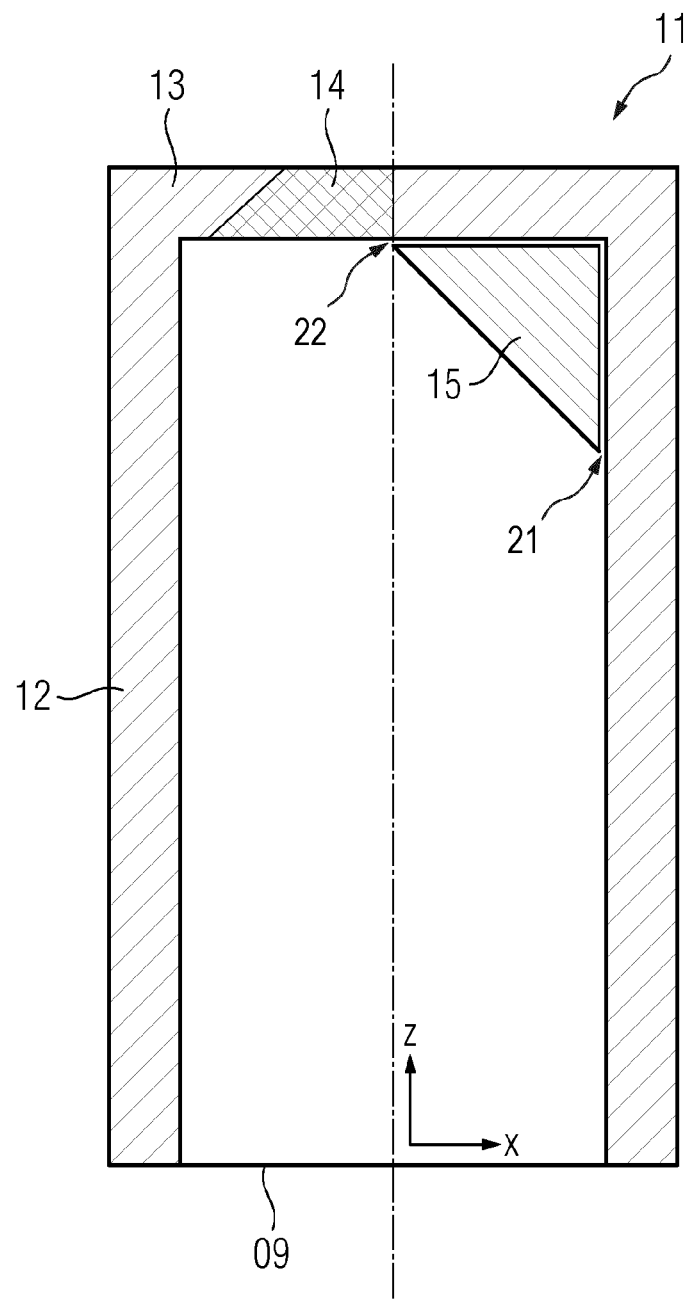
FIG. 2 shows a second schematic illustration of another example of a component according to the invention.
Figure 3:
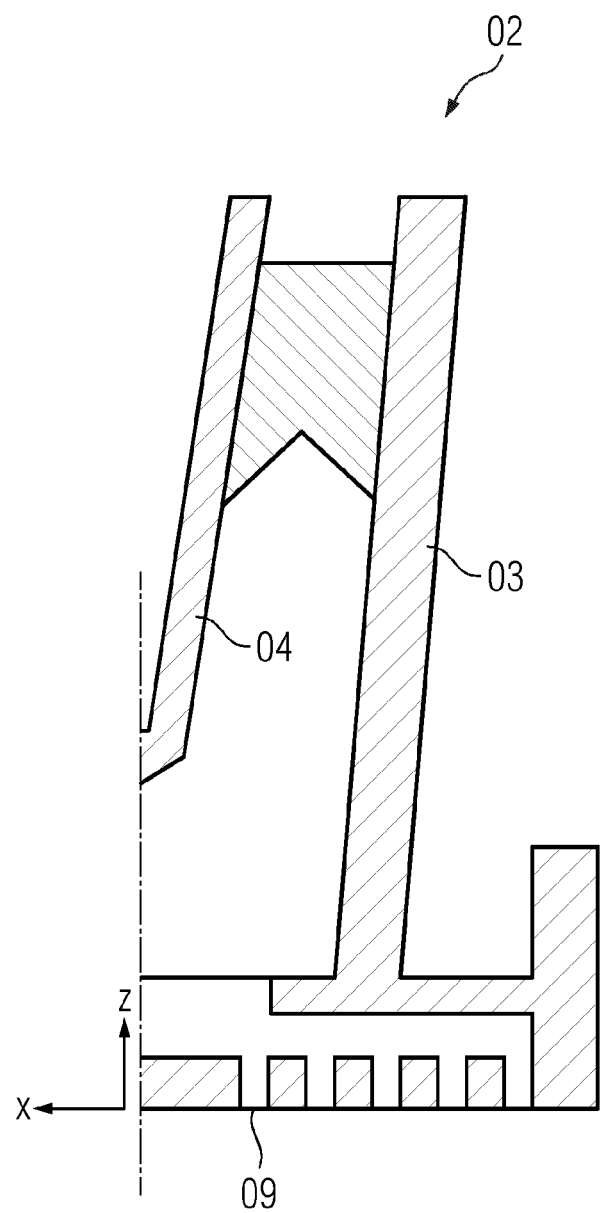
FIG. 3 shows an illustration of the finished part as a component part of the component of FIG. 1.

FIG. 2 schematically outlines a further exemplary embodiment of a component 11 according to the invention. The component 11 likewise comprises a finished part 12 and a support structure 15. In this case, the finished part 12 has a pot-like shape which is open to the base plane 09. Here, the vertical wall extending in the Z direction forms an easy partial section 13 and the horizontal wall extending parallel to the base plane 09 forms the difficult partial section 14.

In this case, it would be possible to provide a support structure from the base plane 09 to the difficult partial section 14, but this would then have to be made disproportionately large. Here too, therefore, it is envisaged that use is made of a support structure 15 which 15 is connected to the easy partial section 13 via a first partial attachment 21 and to the difficult partial section 14 via a second partial attachment 22.

FIG. 2 now outlines the finished part 02 of the component from FIG. 01, only half of which is illustrated. The build-up of the finished part 02 in the direction of the Z axis can be seen, starting from the base plane 09, which 09 extends in an X direction and Y direction. During the build-up in layers in the powder-bed manufacturing process, it is possible to produce the easy partial section 03, whereas the difficult partial section 04 hangs as it were freely in the air, and there is therefore no starting point for the build-up in layers. Accordingly, the support structure 05 is required here.

Figure 4:
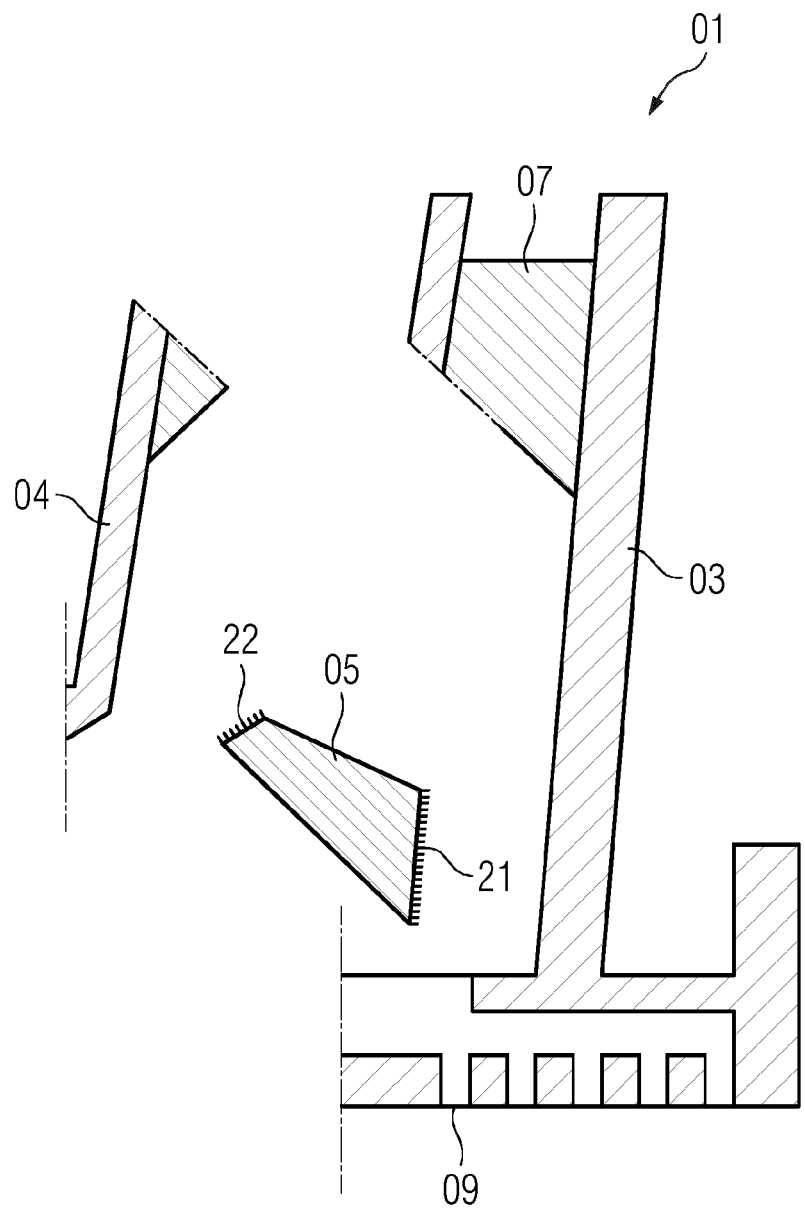
FIG. 4 shows an exploded illustration of the component of FIG. 1 divided into the easy partial section, the difficult partial section and the support structure.

In this regard, FIG. 4 shows the division of the component 01—likewise, once again, only half is illustrated—comprising an easy partial section 03 and a difficult partial section 04 of the finished part 02, as well as the support structure 05.

Figure 5:
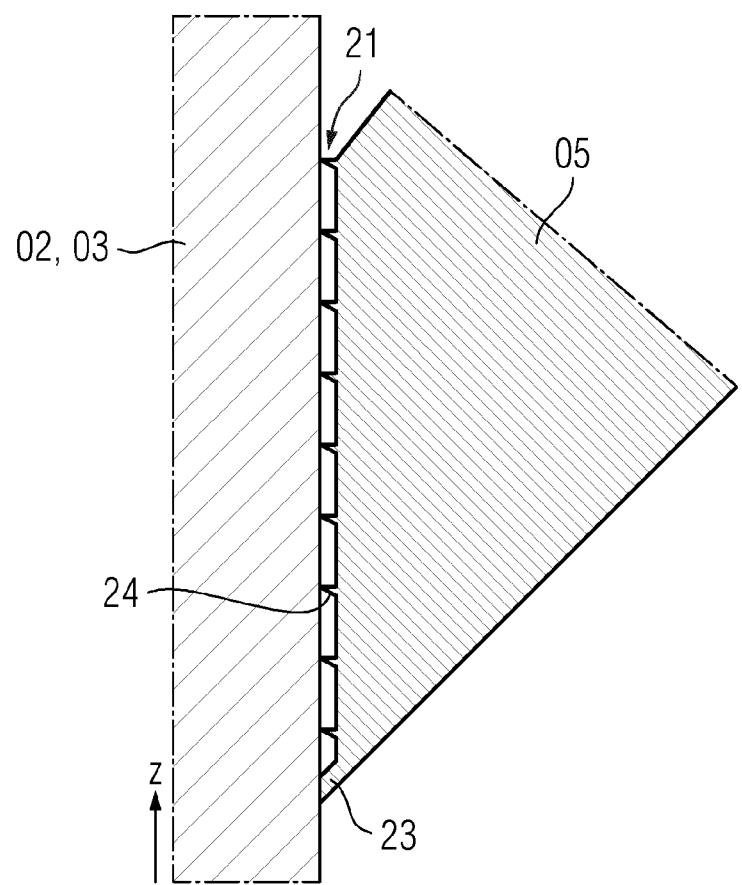
FIG. 5 shows, in the form of a sketch, the first partial attachment between the easy partial section and the support structure.

FIG. 5 schematically illustrates the region of the first partial attachment 21 of the component 01. In principle, it is envisaged according to the invention that the connection between the easy partial section 03 of the finished part 02 and the support structure 05 is implemented by a multiplicity of small connection points 24, and a small free distance remains between the connection points 24.

Furthermore, it can be seen that an attachment in the form of a bridge element 23, which is wider than the connection points 24, is present at the edge of the first partial attachment 21 which is adjacent to the base plane 09.

Figure 6:
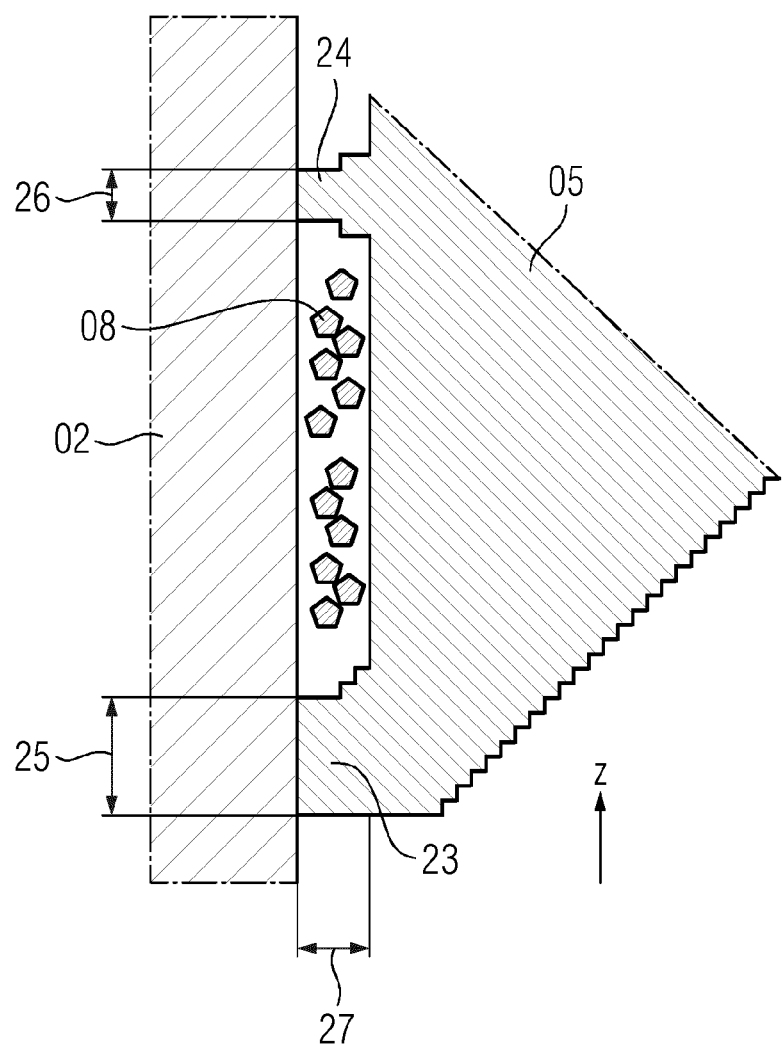
FIG. 6 shows a detail view of a connection point and a bridge element of the first partial attachment.

In this regard, FIG. 6 outlines in detail the first partial attachment 21 in the region of the bridge element 23 and of the connection point 24 located above it. The bridge element 23 is provided at the lower edge of the support structure 05 as a connection to the finished part in order to enable sufficient heat dissipation to be ensured initially. At the same time, however, the selected width 25 of the bridge element should also be as small as possible. It has proven advantageous if the bridge element is reproduced over a few layers in the powder-bed manufacturing process.

In contrast, it is desirable in all cases for the selected connection points 24 to be as small as possible. In particular, it should be ensured that an equivalent diameter 26 of the connection point 24 is less than the usual width of the material melted by the manufacturing process. It is thus possible to achieve easier removal of the support structure 05 from the finished part 02 in the subsequent process.

It can also be seen that the selected distance 27 between the support structure 05 and the finished part 02 in the first partial attachment 21 is small. Obviously, particles 08 of the powdered material used in the manufacturing process get trapped between the support structure 05 and the finished part 02. The small distance promotes heat transfer from the support structure 05 to the finished part 02 via the trapped particles 08 in between.

Figure 7:
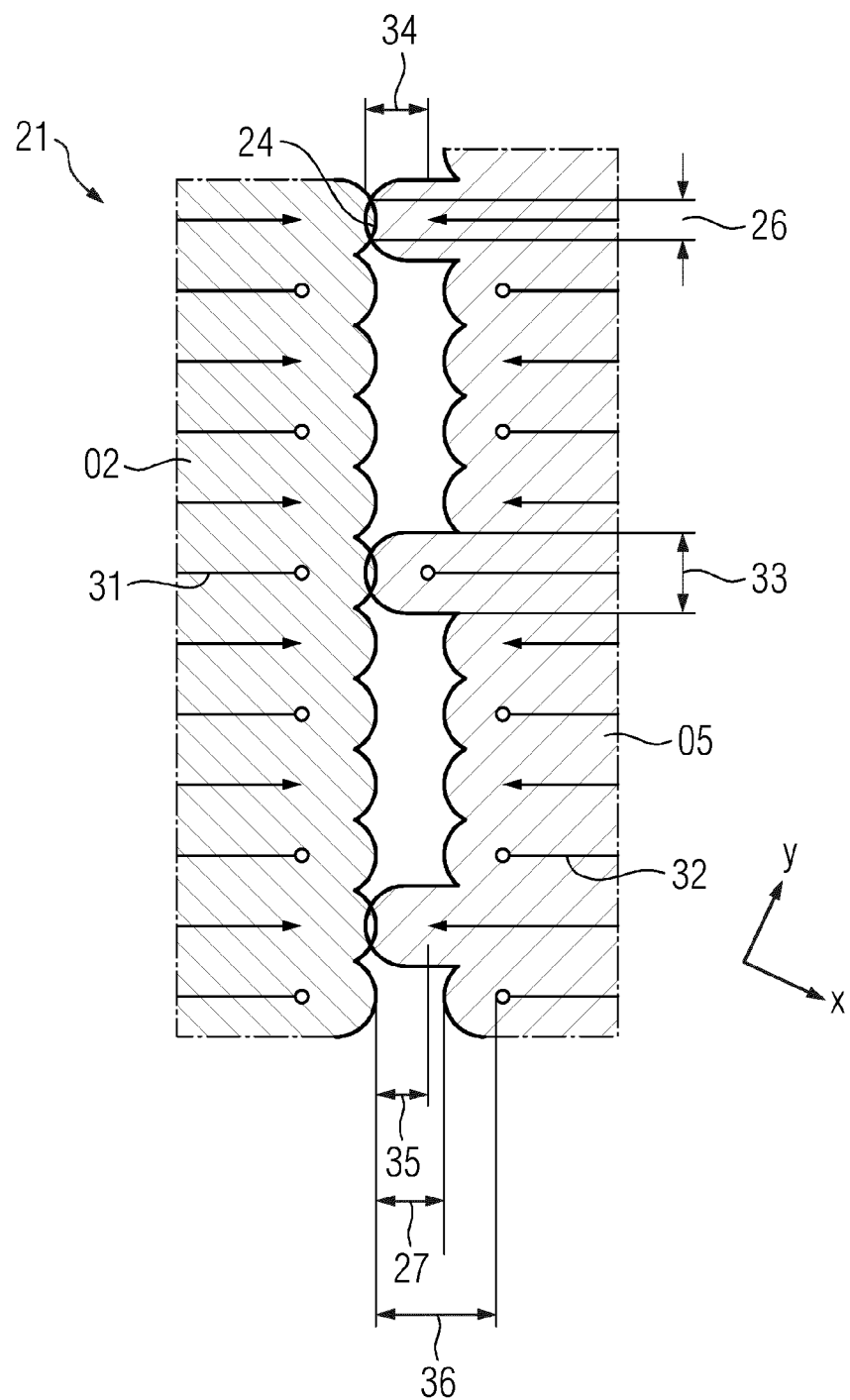
FIG. 7 shows a detail view with a schematic illustration of the manufacturing method for reproducing the connection points.

The manufacture of the component 01 in the envisaged powder-bed manufacturing process in the region of the first partial attachment 21 is outlined schematically in FIG. 7. On the right-hand side, support structure 05 is sketched. Opposite, on the left-hand side, there is a section of the finished part 02. In the manufacturing process, the surrounding particles are melted by means of an energy-intensive beam. During this process, the respective beam is guided along a vector 31, 32. Around the center of the beam there is a melting zone with a melting point extent 33. It is furthermore possible, at the end of a respective vector, to determine a melting radius 34 which indicates the extent of the melting zone, starting from the beam center, at the end of the vector in the direction of finished part 02.

As can be seen from the illustration, the respective connection point 24 has an equivalent diameter 26 which 26 is smaller than would correspond to the melting point extent 33. In order to achieve this, the selected distance 35 from the beam center to the finished part 02 during the reproduction of the connection points 24 is advantageously smaller than the melting radius 34 but advantageously greater than 0.6 times the melting radius 34.

It is furthermore possible to discern from the illustration the position of the respective vectors 31 for reproducing the finished part 02 and of the vectors 32 for reproducing the support structure 05. In order to ensure a defined, predictable equivalent diameter 26 of the connection point 24, provision is made in this exemplary embodiment for the vectors 31, 32 to be aligned with one another.

As stated above, it is advantageous if the selected distance 27 between the support structure 05 and the finished part 02 is as small as possible. At the same time, however, an uncontrolled connection between the connection points 24 must be avoided. Provision is therefore made for the distance 36 from the beam center to the finished part 02 in the first partial attachment 21 between the connection points 24 to correspond approximately to twice to three times the melting radius 34.

The invention claimed is:

1. A method for manufacturing a component starting from a base plane which extends in an X direction and a Y direction and defines a vertical Z direction, comprising:
   providing a model of a finished part;
   determining an easy partial section of the finished part to be produced starting from the base plane without a support structure and a difficult partial section of the finished part which is spaced apart from the base plane and cannot be produced without the support structure;
   determining the support structure, which is to be connected to the easy partial section via a first partial attachment and to the difficult partial section via a second partial attachment,
   manufacturing the component in a powder-bed production process in which local melting of a powdered material is accomplished by a beam,
   forming connection point extensions via the powder-bed production process, each connection point extension extending from the support structure,
   forming a multiplicity of connection points, wherein each connection point connects a respective connection point extension to the finished part,
   wherein the first partial attachment is formed by at least one bridge element having a width of at most 2 mm, and further formed by the multiplicity of connection points, each connection point having an equivalent diameter of at most 1mm, and each equivalent diameter being smaller than a width of a connection point extension leading to the respective connection point,
   wherein in each partial attachment a total of cross-sectional areas of the multiplicity of connection points taken at the respective equivalent diameters corresponds to at least 5 times a total of cross-sectional areas of the at least one bridge element, and
   wherein when forming the multiplicity of connection points, a beam center forming a respective connection point extension within a respective layer maintains a first separation distance from a portion of an adjacent partial section that is within the respective layer and a beam center moving along a partial section within a respective layer maintains the first separation distance from a respective connection point extension that is within the respective layer.

2. The method as claimed in claim 1, wherein in each layer first the respective connection point extension support structure and subsequently the portion of the adjacent partial section are produced.

3. The method as claimed in claim 1, wherein the first separation distance is at least 0.05 mm.

4. The method as claimed in claim 1, wherein where a portion of the support structure that is within a respective layer and a portion of the adjacent partial section that is within the respective layer are not directly connected to each other, a second separation distance from the beam center that forms the support structure to the adjacent partial section is maintained and is at most 1.5 mm, in at least half an area of the first partial attachment.

5. The method as claimed in claim 1, wherein a specific melting radius of a melt pool formed by the beam is a radius of the melt pool measured perpendicularly from the beam center, and
wherein the first separation distance corresponds to at least 0.1 times and at most 0.9 times, the specific melting radius present when the respective connection points are formed.

6. The method as claimed in claim 1, wherein a specific melting radius of a melt pool formed by the beam is a radius of the melt pool measured perpendicularly from the beam center, and
wherein in at least half an area of the first partial attachment in which a portion of the support structure that is within a respective layer and a portion of the adjacent partial section that is within the respective layer are not directly connected to each other, a second separation distance from the beam center that forms the support structure to the adjacent partial section is maintained and corresponds to at most 10 times, the specific melting radius present when the respective connection points are formed.

7. The method as claimed in claim 1, wherein the beam is guided along vectors during the production, and
wherein vectors in the production of the support structure are aligned with vectors in the production of the finished part so that connection points of the multiplicity of connection points are formed as the beam travels along the support structure and within the respective layer and along the portion of the adjacent partial section that is within the respective layer along a common vector.

8. The method as claimed in claim 3, wherein the first separation distance is at least 0.1 mm.

9. The method as claimed in claim 4, wherein the second separation distance is at most 1 mm, in at least half the area of the first partial attachment.

10. The method as claimed in claim 5, wherein the first separation distance corresponds to at least 0.5times and/or at most 0.8 times, the specific melting radius.

11. The method as claimed in claim 6,
wherein the second separation distance corresponds to at most 5 times the specific melting radius.

12. The method as claimed in claim 6,
wherein the second separation distance corresponds to at most 3 times the specific melting radius.

13. The method as claimed in claim 1, further comprising forming the connection point extension with a single pass of the beam.

* * * * *